Aug. 3, 1965     E. LEVY ETAL     3,198,900
APPARATUS FOR DETECTING A CHANGE IN ROTATIONAL SPEED
Filed May 7, 1963
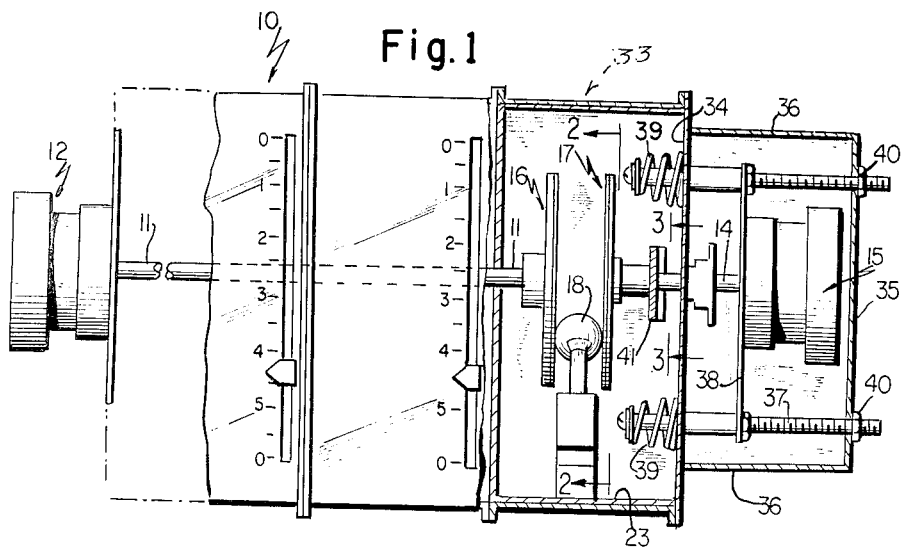
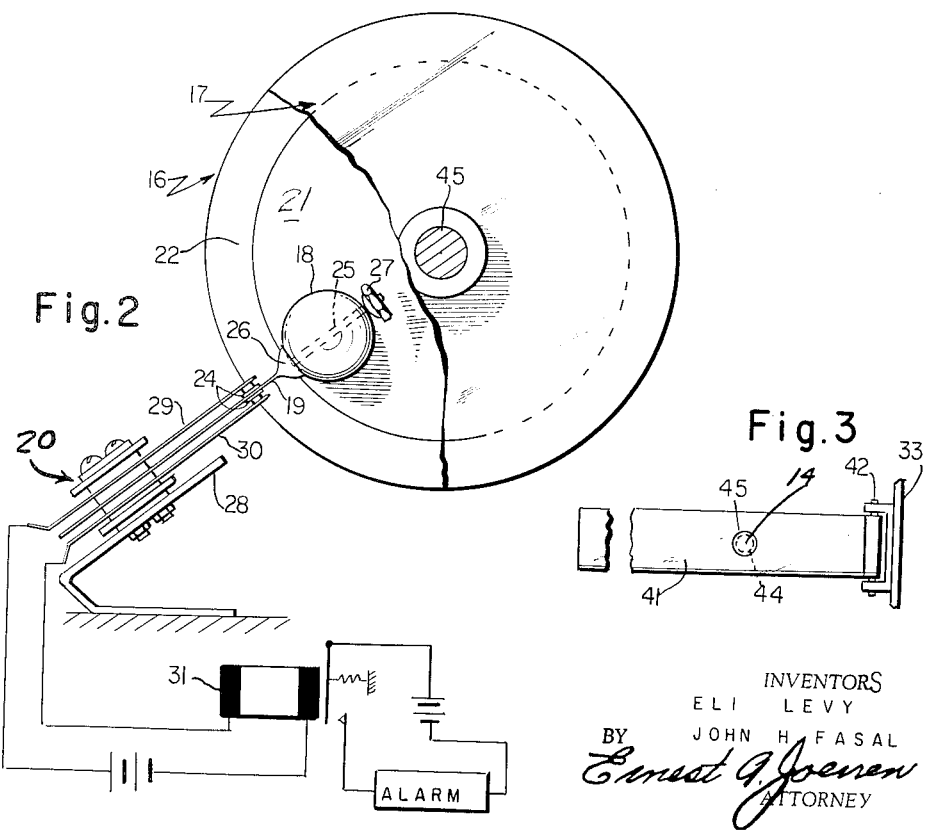
INVENTORS
ELI LEVY
JOHN H. FASAL
BY Ernest G. Joenen
ATTORNEY

United States Patent Office 3,198,900
Patented Aug. 3, 1965

3,198,900
APPARATUS FOR DETECTING A CHANGE
IN ROTATIONAL SPEED
Eli Levy, Bloomfield, N.J., and John Harry Fasal, New York, N.Y., assignors to Specialties Development Corporation, Belleville, N.J., a corporation of New Jersey
Filed May 7, 1963, Ser. No. 278,638
10 Claims. (Cl. 200—61.46)

The present invention relates to apparatus for detecting a change in rotational speed of a drive shaft or the like, and, more particularly, to such apparatus which is adapted to supervise the speed of a condition monitoring device such as disclosed in United States Patent No. 3,022,390, dated February 20, 1962.

The device disclosed in the aforementioned patent includes a timing arrangement for supervising around-the-clock operation of various equipment and for giving an alarm when a certain condition persists for longer than a desired duration. This type of an arrangement thus includes a timing motor such as an electric clock motor which is geared to rotate one revolution every twenty four hours. In view of the fact that the motor and the parts driven by it move so slowly, manual supervision or ordinary motion indicators cannot be relied upon to almost instantly detect loss of speed or complete stoppage of the motor due to malfunctioning of the motor or shaft rotation.

Accordingly, an object of the present invention is to provide apparatus for detecting a change in rotational speed which is capable of responding to extremely small changes in speed and stoppage of means rotated at extremely low speeds.

Another object is to provide such apparatus which is readily reset after responding to an unwanted condition.

Another object is to provide such apparatus which responds to its failure and thus supervises itself.

A further object is to provide such apparatus which is simple and economical in construction and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention these objects are generally accomplished by apparatus comprising a pair of concentrically aligned rotatable shafts, a timing motor for rotating each of the shafts at the same speed but in opposite directions, a wheel mounted on each of the shafts for rotation therewith and being spaced apart from each other, a member having a circular zone operatively engaged by the wheels to effect rotation of the member, a movably mounted element for rotatably supporting the member in a given position, and switch means operable upon movement of said element, whereby, upon a change in rotational speed of either of the shafts, the member will be displaced to effect operation of the switch means.

A preferred embodiment of the invention has been chosen for purposes of illustration and description, and is shown in the accompanying drawing, forming a part of the specification, wherein:

FIG. 1 is a fragmentary front elevational view of apparatus in accordance with the present invention.

FIG. 2 is a side elevational view taken along the line 2—2 on FIG. 1 with one of the wheels partly broken away and illustrating a simplified wiring diagram of an alarm circuit under the control of the switch means.

FIG. 3 is a sectional view taken along the line 3—3 on FIG. 1 illustrating an arrangement for resetting the apparatus.

Referring now to the drawing in detail, the apparatus in accordance with the present invention is shown as being installed on a condition monitoring device 10 such as shown in the aforementioned patent, which device includes a shaft 11 for driving the same and an electric clock motor 12 for rotating the shaft 11 one revolution in every twenty four hours. The apparatus generally comprises a second shaft 14 concentrically aligned with the shaft 11, a second electric clock motor 15 for rotating the shaft 14 at the same speed as the shaft 11 is rotated but in the opposite direction, a wheel 16 mounted on the shaft 11 for rotation therewith, a second wheel 17 mounted on the shaft 14 for rotation therewith and facing the wheel 16 but being spaced therefrom, a round member such as a ball 18 or a spherical zone of a ball, a movable element 19 for rotatably supporting the ball and for positioning the ball between the wheels 16 and 17 to be engaged at diametrically opposite points by the wheels, and switch means 20 operable by the element 19 in the manner described hereinafter.

The wheels 16 and 17, in the embodiment shown, are discs each having a flat central surface 21 formed of or coated with a material having a relatively high co-efficient of friction whereby rotary motion is imparted to the ball by rotation of the surfaces 21 in opposite directions. For example, the wheel 16 is rotated clockwise and the wheel 17 is rotated counterclockwise (FIG. 2), whereby the ball rotates clockwise as viewed in FIG. 1. In order to retain the ball between the wheels while resetting the same as will be described hereinafter, an annular raised portion 22 surrounds the central surface 21 of each wheel. Instead of driving the ball by friction, positive driving formations such as gear teeth could be provided on the wheels and the ball member or its equivalent. Alternatively, the wheels could be magnetized to hold a steel ball therebetween.

The element 19 preferably is in the form of a spring blade having electrical contacts 24 at opposite sides and an axle portion 25 at its free end extending diametrically through the ball (FIG. 2). A cup 26 is provided at the lower end of the axle portion for rotatably supporting the ball with a minimum of friction, and means such as a nut 27 is provided on the axle portion for retaining the ball on the cup.

The switch means 20 include a base 28 for mounting the other end of the spring blade, and a pair of yieldable switch contacts 29 and 30 also mounted at one end on the base 28 and insulated from each other and the spring blade. The base 28 is mounted on the lower horizontal wall 23 of a casing 33. As shown in FIG. 2, the contacts 29 and 30 are on opposite sides of the spring blade and normally engage the contacts 24 to provide an electrical connection between them.

The switch means thus normally provide a closed circuit for energizing a relay 31 which upon de-energization closes an alarm circuit including such safety devices which may be deemed necessary or desirable.

In operation, while both wheels are rotating at the same speed but in the opposite direction indicated, the ball is rotated clockwise and is maintained in the position shown in FIG. 2, whereby the switch means 20 remain closed. In the event the motor 12 loses speed or stops, the wheel 17 rolls the ball 18 in a counter-clockwise direction on the wheel 16 which causes the spring blade 19 to flex downwardly as viewed and separate the contacts 24 and 29 whereupon the relay 31 is de-energized and an alarm is given. In the event the motor 15 loses speed or stops, the wheel 16 rolls the ball 18 in a clockwise direction on the wheel 17 which causes the spring blade 19 to flex upwardly and separate the contacts 24 and 30 whereupon an alarm is given. In this manner, the motors 12 and 15 through the wheel and ball arrangement supervise each other.

In order to facilitate re-setting of the ball 18, means are provided for slidably mounting the shaft 14 to enable the wheels 16 and 17 to be moved apart and release the ball, whereby the spring blade 19 straightens and returns the ball to the position shown in FIG. 2 and effects reclosing of the switch means.

Such means, as shown in FIGS. 1 and 3, may comprise a pair of spaced apart vertical frame members or walls 34 and 35 connected by upper and lower horizontal frame members or walls 36, a pair of rods 37 extending through holes in the frame members 34 and 35 to slidably mount the same a cross-piece 38 secured to the rods 37 and having the motor 15 mounted thereon, a spring 39 biased between the frame member 34 and the end of the rods extending therethrough, a stop nut 40 on the other end of the rods for engaging the frame members 35, and a manually operable lever 41 pivotally mounted by a hinge 42 on a vertical wall 43 of the casing 33 and having an opening 44 through which a reduced portion 45 of the shaft 14 extends. Thus, by turning the lever to the right as viewed in FIG. 1, the motor 15, its shaft 14 and the wheel 17 slide towards the right.

In the foregoing arrangement the springs 39 also serve to supply the desired force the wheel 17 exerts on the ball 18 from the left as viewed to maintain the ball in frictional engagement with the wheels 16 and 17, and the stop nuts 40 can be adjusted to regulate such force.

The response time of detecting change of speed can be varied by using balls 18 of different diameters and/or positioning the ball at different radii between the wheels 16 and 17.

From the foregoing description, it will be seen that the present invention provides change of speed detecting apparatus adapted to sense extremely small changes in speed. The apparatus can be readily placed on newly fabricated devices or on devices already in use simply by equipping the right end of the shaft 11 with the wheel 16, and arranging the motor 15, the wheel 17, the ball 18 and the switch means 20 as shown.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In apparatus for detecting a change in rotational speed, the combination of a pair of concentrically aligned rotatable shafts each having an end adjacently spaced from the other, a timing motor for each shaft arranged for rotating said shafts at the same speed in opposite directions, a wheel mounted on each of said shafts for rotation therewith and being spaced apart from each other, a member having a circular zone operatively engaged by said wheels at diametrically opposite points thereof to effect rotation of said member, a movably mounted element for rotatably supporting said member in a given position, and switch means operable by said element upon movement thereof, whereby, upon a change in rotational speed of either of said shafts, said member will be displaced to effect operation of said switch means.

2. In apparatus according to claim 1, wherein said wheels are disks having a flat surface for frictionally engaging said member.

3. In apparatus according to claim 2, wherein said member is a ball.

4. In apparatus according to claim 3, wherein said ball rides on said flat surfaces and said disks have an annular portion surrounding said surface for retaining said ball between said disks.

5. In apparatus according to claim 1, including means for slidably mounting one of said shafts to enable said wheels to be moved apart to facilitate resetting of said member.

6. In apparatus according to claim 5, including spring means for urging said slidably mounted shaft toward said other shaft to cause said wheels to be urged against said member.

7. In apparatus according to claim 6, including lever means for moving said slidably mounted shaft away from said other shaft.

8. In apparatus according to claim 7, wherein said member is a ball and said wheels are disks having a flat surface for frictionally engaging said ball and having an annular portion surrounding said surface for retaining said ball between said disks when said disks are moved apart to reset said ball.

9. In apparatus according to claim 5, wherein said element is a spring blade adapted to reset said member upon moving said wheels apart.

10. In apparatus according to claim 9, wherein said element has a switch contact thereon and said switch means include a pair of yieldable contacts normally engaging said first contact to close a circuit which circuit is open upon movement of said element to cause its said contact to disengage one of said switch means contacts.

References Cited by the Examiner

UNITED STATES PATENTS

| 2,663,863 | 12/53 | Buehler | 340—268 |
| 2,731,630 | 1/56 | Karlson | 340—268 |
| 2,868,911 | 1/59 | Wilhelmson | 200—61.46 |

FOREIGN PATENTS 292,840  8/53  Switzerland.

BERNARD A. GILHEANY, *Primary Examiner.*

ROBERT K. SCHAEFER, *Examiner.*